(No Model.)

H. BASLER.
SYRINGE.

No. 432,293.  Patented July 15, 1890.

WITNESSES:

INVENTOR:
Hugo Basler
BY
ATTORNEYS,

# UNITED STATES PATENT OFFICE.

HUGO BASLER, OF BROOKLYN, NEW YORK.

SYRINGE.

SPECIFICATION forming part of Letters Patent No. 432,293, dated July 15, 1890.

Application filed March 27, 1890. Serial No. 345,564. (No model.)

*To all whom it may concern:*

Be it known that I, HUGO BASLER, of Brooklyn, in the county of Kings and State of New York, a citizen of the United States, have invented certain new and useful Improvements in Pistons for Syringes, of which the following is a specification.

This invention relates to improvements in pistons for syringes; and the object of my invention is to provide a new and improved syringe-piston which is so constructed that its washers can readily be expanded against the sides of the barrel by means of the nut on the end of the barrel.

The invention consists in the construction and combination of parts and details, as will be fully described hereinafter, and pointed out in the claim.

Figure 1:
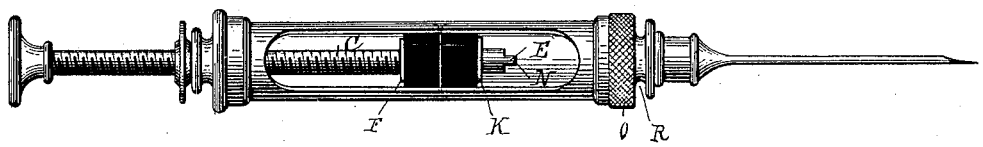
Figure 2:
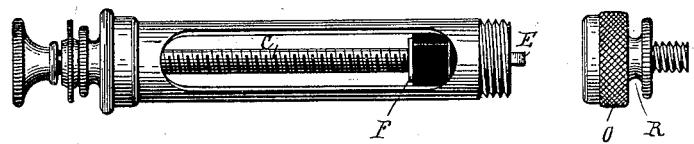
Figure 3:
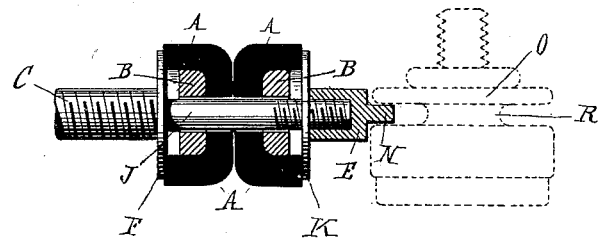

In the accompanying drawings, Figure 1 is a side view of a syringe with my improved piston; Fig. 2, also a side view with the nozzle-cap detached from the barrel; and Fig. 3 is an enlarged detail sectional view of the piston.

Similar letters of reference indicate corresponding parts.

In the drawings, A A represent the cups of my improved piston, which cups are made of leather, rubber, or other suitable elastic material. In each cup A is arranged a ring-shaped metallic filling-piece B, by which a certain rigidity is imparted to the body of the cups A. The piston-rod C is provided with an end portion J, of somewhat smaller diameter than the main part of the rod, said smaller portion being screw-threaded at its outer end for applying a screw-nut E, as usual in pistons for syringes. A fixed washer F is attached to the piston-rod next to the shoulder formed on the same, the cups, with their interior filling-piece B, being then placed on the end portion J next to the washer F, while a second washer K is applied against the opposite edge of the cups A, the nut E bearing on the washer K, and serving thereby to compress the cups A A whenever the same have to be tightened up for fitting tightly into the barrel of the syringe. The nut E is provided with a transverse rib N at its end, which serves for applying a suitable turning device or wrench to the same, by means of which the nut can be turned. For the sake of convenience the cap O, to which the nozzle or needle is attached, is used for the purpose of a wrench by providing the same with an exterior annular groove R, which is applied to the rib N in the manner shown in dotted lines in Fig. 3, after the cap O has been detached from the syringe-barrel, as shown in Fig. 2.

When the cups forming the piston of the syringe have become dry and contract, so as not to fit tightly in the barrel, the nut E is screwed up, whereby the cups are compressed between the washers F and K, so as to be spread or distended. The washers close up the ends of the cups, and have the advantage that the drying of the cups is retarded.

The piston is simple in construction, effective in use, and can be readily adjusted to fit snugly and tightly into the barrel.

Having thus described my invention, I claim as new and desire to secure by Letters Patent—

The combination of a piston-rod having a threaded end portion of smaller diameter than the main part of the piston-rod, so as to form a shoulder, a fixed washer abutting against said shoulder, a piston formed of elastic cups mounted on the end portion, a second washer placed against the opposite end of said piston, a nut screwed on the end of the piston-rod and provided with a rib at its end, and a cap screwed on the end of the barrel and provided with an annular groove that is adapted to engage the rib of the tightening-nut on detaching said cap from the barrel, substantially as set forth.

In testimony that I claim the foregoing as my invention I have signed my name in presence of two subscribing witnesses.

HUGO BASLER.

Witnesses:
MARTIN PETRY,
JOHN A. STRALEY.